(12) United States Patent
Yokomori et al.

(10) Patent No.: US 6,711,456 B2
(45) Date of Patent: Mar. 23, 2004

(54) NC DATA MANAGEMENT APPARATUS AND METHOD

(75) Inventors: Masashi Yokomori, Hirakata (JP); Keiji Hanada, Hirakata (JP); Kouichi Kanematsu, Otsu (JP); Takuya Harada, Sasayama (JP)

(73) Assignee: Matsushita Electric Industrial Co., Ltd, Osaka-fu (JP)

( * ) Notice: Subject to any disclaimer, the term of this patent is extended or adjusted under 35 U.S.C. 154(b) by 0 days.

(21) Appl. No.: 10/164,208

(22) Filed: Jun. 6, 2002

(65) Prior Publication Data

US 2003/0014139 A1 Jan. 16, 2003

(30) Foreign Application Priority Data

Jun. 7, 2001 (JP) ........................................ 2001-172592

(51) Int. Cl.[7] .............................................. G06F 19/00
(52) U.S. Cl. ......................................... 700/169; 700/96
(58) Field of Search ............................ 700/95, 96, 99, 700/100, 102, 117, 121, 169; 705/28

(56) References Cited

U.S. PATENT DOCUMENTS 4,591,983 A * 5/1986 Bennett et al. ............ 364/403
5,283,745 A * 2/1994 Tanaka ...................... 364/468
5,822,210 A * 10/1998 Kobayashi et al. ..... 364/468.28
5,950,201 A * 9/1999 Van Huben et al. .......... 707/10

FOREIGN PATENT DOCUMENTS

JP          10-149211          6/1998

* cited by examiner

Primary Examiner—Leo Picard
Assistant Examiner—Sean P. Shechtman

(57) ABSTRACT

A production system including a production line having a series of pieces of production equipment, each of which has a parts supply unit. The production system includes an NC management apparatus that is connected with each piece of the production equipment via a local-area network and acquires therefrom NC data used for operating each piece of the production equipment, and a scheduling apparatus that generates a production schedule and transmits the generated production schedule to the NC management apparatus via the local-area network. The NC management apparatus generates, for each piece of the production equipment, data that is required to perform production according to the production schedule, obtains, for each piece of the production equipment, values that represent differences between current NC data that has been most recently acquired and the generated data, and outputs the values.

8 Claims, 21 Drawing Sheets

FLOWCHART OF NC DATA MANAGEMENT SYSTEM

FIG.4

| | | | | | | | | QUALITY FRAC- TION | | | |
|---|---|---|---|---|---|---|---|---|---|---|---|
| UPDATE DATE | BOARD NAME | LINE NAME | EQUIP- MENT NAME | INSPEC- TION STATUS | DATA TYPE | PROGRAM NAME | VER- SION | DEFEC- TIVE (ppm) | EFFEC- TIVE DATE | CHECK | SPEC CHANGE NO. |
| 2000/ 5/30 | CT201 | LINE-1A | MV2V_1A | INSPEC- TED | NC PRO | EG12345A00S01 | 1 | 100 | 2000/ 6/1 | ☐ | |
| 2000/ 6/2 | CT201 | LINE-1A | MV2V_1A | INSPEC- TED | NC PRO | EG12345A00S02 | 2 | 20 | 2000/ 6/12 | ■ | 100 |
| 2000/ 6/2 | CT201 | LINE-1A | MV2V_1A | INSPEC- TED | AR- RANGE- MENT PRO | EG12345A00S01 | 1 | 13 | 2000/ 6/1 | ■ | |
| 2000/ 6/2 | CT201 | LINE-1A | MV2V_1A | INSPEC- TED | PUB | EG12346A00S02 | 1 | 12 | 2000/ 6/12 | ■ | |
| 2000/ 6/2 | CT201 | LINE-1A | MV2V_1A | INSPEC- TED | RAW BOARD | EG12348A00S01 | 1 | — | 2000/ 6/1 | ■ | |
| 2000/ 6/2 | CT201 | LINE-1A | — | INSPEC- TED | PARTS TABLE | EG12349A00S01 | 1 | — | 2000/ 6/1 | ■ | |

DATA TYPE: ▽
ALL
NC PROGRAM
ARRANGEMENT PROGRAM
BOARD PROGRAM
PARTS LIBRARY
SUPPLY LIBRARY
RAW BOARD
PARTS TABLE

BOARD NAME: ▽ SPECIFY OR SELECT ALL

LINE NAME: ▽ SPECIFY OR SELECT ALL

EQUIPMENT NAME: ▽ SPECIFY OR SELECT ALL ( DISPLAY ) ( ADD ) ( EDIT ) ( DELETE ) ( REGISTER )

(PROCESSING STATUS AND ERROR LOG ARE DISPLAYED)

FIG.5

OUTPUT LINE IS SELECTED
ALL
LINE1-B
LINE2-A

NC DATA MANAGEMENT SYSTEM
(DISPLAYING PRODUCTION PREPARATION TABLE)

LINE NAME:LINE1-A

| MAN-AGE-MENT NO. | EN-TER FLAG | BATCH DOWN-LOAD BUTTON | COM-MON PARTS LIBRARY SET-TING-BUTTON | NC PREPA-RA-TION-STATUS | PRO-DUC-TION START DATE/TIME | LOT NO. | BOARD NAME | LINE NAME | SUR-FACE SEC-TION | NUM-BER OF PROD-UCTS | PARTS TABLE | UP-DATE DATE | EQUIP-MENT NAME | PARTS |
|---|---|---|---|---|---|---|---|---|---|---|---|---|---|---|
| | | | | | | | | | | | | | NA 21A | ○○○○○ |
| 1 | ■ | ■ | ■ | ○ | 2000. 6/6 9:00 | 00000001 | CT201 | LINE-1A | TABLE | 23 | ○ | 2000. 6/2 | | |
| | | | | | | | | | | | | | NA 21A | ○○○○- |
| 2 | ■ | ■ | ■ | ○ | 2000. 6/6 10:00 | 00000002 | CT202 | LINE-1A | TABLE | 34 | ○ | 2000. 6/2 | | |
| 3 | ■ | ■ | ■ | ○ | 2000. 6/6 13:00 | 00000003 | CT203 | LINE-1A | TABLE | 12 | ○ | 2000. 6/2 | | |
| 4 | ■ | ■ | ■ | ○ | 2000. 6/6 15:00 | 00000004 | CT204 | LINE-1A | TABLE | 11 | ○ | 2000. 6/2 | | |
| 5 | □ | □ | □ | △ | 2000. 6/6 17:00 | 00000005 | CT205 | LINE-1A | TABLE | 10 | ○ | 2000. 6/2 | | |
| 6 | □ | □ | □ | ○ | 2000. 6/6 19:00 | 00000006 | CT206 | LINE-1A | TABLE | 3 | × | 2000. 6/2 | | |

(PROCESSING STATUS AND ERROR LOG ARE DISPLAYED)

SELECT MANAGEMENT NO. AND SELECT 3 TO OPEN LOWER SCREEN

FIG.8

| UPDATE DATE | EQUIP-MENT NAME | EQUIP-MENT TYPE | PARTS SHAPE CODE | PARTS SHAPE VERSION ID | INSPECTION STATUS (0:NC MAN-AGEMENT,1 :INSPECTED) | FRACTION DEFEC-TIVE (ppm) | PARTS NUMBER | OLD PARTS SHAPE CODE | SETTING FLAG (0: UNUSED, 1:USED) |
|---|---|---|---|---|---|---|---|---|---|
| 2000/7/21 | MV2V_1A | MV2V | M1608R | 1 | CAM | — | | | ☐ |
| 2000/7/24 | MV2V_1A | MV2V | M1608R | 2 | INSPECTED | 100 | ERJ3GEYJ221V | M1608R | ■ |
| 2000/7/21 | MV2V_1A | MV2V | M1608R-1 | 1 | INSPECTED | 80 | | | ■ |
| 2000/7/21 | MV2V_1A | MV2V | 2125CT06-E | 1 | CAM | — | | | ☐ |
| 2000/7/24 | MV2V_1A | MV2V | 2125CT06-E | 1 | INSPECTED | 50 | | | ■ |
| 2000/7/21 | MV2V_1A | MV2V | 3212C | 1 | CAM | — | | | ☐ |
| 2000/7/24 | MV2V_1A | MV2V | 3212C | 1 | INSPECTED | 80 | | | ■ |
| 2000/7/21 | MV2V_1A | MV2V | M3216CT11-E | 1 | CAM | — | | | ☐ |
| 2000/7/24 | MV2V_1A | MV2V | M3216CT11-E | 1 | INSPECTED | 20 | | | ■ |
| 2000/7/21 | MV2V_1A | MV2V | M3325R | 1 | CAM | — | | | ☐ |
| 2000/7/21 | MV2V_1A | MV2V | M3325R | 1 | INSPECTED | 20 | | | ■ |

Buttons: DISPLAY, ADD, EDIT, DELETE, REGISTER

EQUIPMENT NAME:MV2A-1A

UPDATE DATE dropdown: ALL / MV2V-1A / MPA2V-1A (PROCESSING STATUS AND ERROR LOG ARE DISPLAYED)

FIG.12

DETAILS OF NC MANAGEMENT DATA DELETE FUNCTION

| UP DATE DATE | BOARD NAME | LINE NAME | EQUIP-MENT NAME | INSPECTION STATUS | DATA TYPE | PROGRAM NAME | VER-SION | QUALITY FRAC-TION DEFEC-TIVE (ppm) | EFFECTIVE DATE | CHECK | SPEC CHANGE NO. |
|---|---|---|---|---|---|---|---|---|---|---|---|
| 2000/5/30 | CT201 | LINE-1A | MV2V_1A | INSPECTED | NC PRO | EG12345A00S01 | 1 | 100 | 2000/6/1 | ☐ | |
| 2000/6/2 | CT201 | LINE-1A | MV2V_1A | INSPECTED | NC PRO | EG12345A00S02 | 2 | 20 | 2000/6/12 | ■ | 100 |
| 2000/6/2 | CT201 | LINE-1A | MV2V_1A | INSPECTED | ARRANGEMENT PRO | EG12346A00S01 | 1 | 13 | 2000/6/1 | ■ | |
| 2000/6/2 | CT201 | LINE-1A | MV2V_1A | INSPECTED | P_LIB | EG12346A00S02 | 1 | 12 | 2000/6/12 | ■ | |
| 2000/6/2 | CT201 | LINE-1A | MV2V_1A | INSPECTED | RAW BOARD | EG12348A00S01 | 1 | — | 2000/6/1 | ■ | |
| 2000/6/2 | CT201 | LINE-1A | — | INSPECTED | PARTS TABLE | EG12349A00S01 | 1 | — | 2000/6/1 | ■ | |

(DELETE)

DELETE BUTTON→CHECK (YES AGAIN OR NO)→DELETE

FIG.15
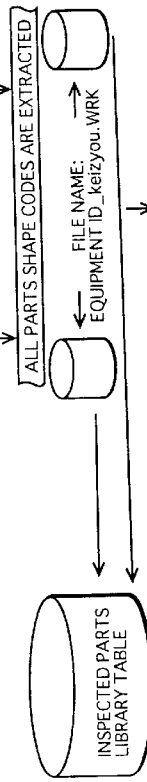

CONSTRUCTION OF NC DATA MANAGEMENT SYSTEM

NC DATA MANAGEMENT APPARATUS AND METHOD

BACKGROUND OF THE INVENTION (1) Field of the Invention

The present invention relates to an NC data management apparatus and method for use in a production system.

(2) Description of the Related Art

In the following description, a printed-circuit board mounting system will be used as an example of a production system.

A printed-circuit mounted board is composed of (a) a printed-circuit board, which is made by printing wiring patterns on a board, and (b) electronic circuit components mounted on the board. The process of mounting the electronic circuit components on the board is called a printed-circuit board mounting process.

For executing the printed-circuit board mounting process, first a "line" is necessary. The line is a series of several apparatuses including an apparatus for printing wiring patterns on the board, apparatuses (mounting equipment) for mounting the electronic circuit components onto the print-circuited board, and an apparatus for inspecting the completed printed-circuit mounted boards. For the execution of the printed-circuit board mounting process, a material management system for managing inventories of the components is also required. A mounting system is composed of the material management system and other elements such as a server for managing the entire mounting process. One system includes at least one line.

The main portion of the mounting system is the mounting equipment. Each piece of the mounting equipment includes (a) a number of cassettes which supply the parts on a one-to-one basis, and (b) a rotary head that includes a plurality of nozzles each of which sucks up one by one the parts supplied from the cassettes and mounts the sucked part on a specified position of a printed-circuit board that comes on the conveyer belt.

The series of operation of sucking the parts from the cassettes and mounting the parts on the printed-circuit board is performed based on NC data. The NC data contains an NC program showing amounting position, a parts arrangement program showing which cassettes are used to carry each part, a board program showing the size of the board to be produced, and a parts library showing conditions for mounting a large surface mounting part on a plate-like object other than a cassette.

Currently, the NC data is created by a printed-circuit board production support system (hereinafter referred to as CAM system) based on a design made by a printed-circuit board design system (hereinafter referred to as CAD system).

The created NC data is loaded onto the mounting equipment by the operator when the boards to be produced are changed based on the production plan. The loaded NC data may be tested with some boards before the actual production process, and may be modified depending on the test results, for improving the mounting quality.

The NC data may be modified by the CAM system a number of times due to design specification changes, parts changes, parts adjustments in the field or the like. As a result, many versions of NC data are generated. This requires a thorough data management since without this, spoiled or defective printed-circuit boards are produced due to erroneous NC data loaded on the mounting equipment.

High productivity is required for the printed-circuit board mounting process. To increase the productivity, the downtime of the line should be as short as possible. From the viewpoint of the productivity, a restless, continuous operation is ideal. Though a downtime for changing the NC data is unavoidable, this downtime can be reduced by using the same order of supplying the parts by cassettes for each board type. With this arrangement, the NC data change can be performed only with the setting of the equipment without loading the parts arrangement program and the parts library.

It takes a lot of time to check whether the NC data has been prepared for a production plan made by the scheduling system since the production plan changes depending on the sales of the products. This tendency is remarkable in recent days when there are demands for a variety of products with small quantities. When the NC data has not been prepared yet, even if the production plan is changed or the CAM system is urged to make the NC data, the production of the product is delayed. Accordingly, the NC data preparation status should always be checked based on the production plan.

Aside from the problem with the productivity, there is a problem that a mounting error may occur in the printed-circuit board mounting process. That is to say, in the case relating to the NC data, a mounting error may occur when a parts table obtained by each piece of mounting equipment has not been updated, while it should have been updated reflecting the changes in the parts number due to parts changes made in request of the design division or the purchasing division.

The mounting error is an error in which an erroneous part is mounted on a print-circuited board or a part is mounted on an erroneous position of a print-circuited board, which happens when a cassette is attached to the mounting equipment at an erroneous position.

The completed printed-circuit mounted boards with erroneously mounted parts are defectives and have no commercial value. When this happens, the parts, the time, the man-hours or the like used for the production are wasted, which also decreases the productivity. The mounting error may happen in both reel changes and cassette changes.

In the printed-circuit board mounting process, a generic name "NC data management process" is used for the NC data version management reflecting design changes, the parts library management reflecting the changes of parts conditions in the field, the NC preparation management reflecting the production plan changes, and the parts table management reflecting the parts name changes.

Conventionally, the NC data creation division receives the design information and the production preparation table information from the design division CAD system, the production management division scheduling system or the like, creates the NC data using the CAM system, and sends the NC data to the production division. Also, the NC data inspected through the production by the mounting equipment is sent as the feedback to the CAM system on an irregular basis by man.

The conventional methods, however, have a problem that it is difficult to recognize the latest version of NC data since various versions of NC data are created due to many design changes by the design division when the design due date comes nearer or many parts number changes are made by the purchasing division as a result of cost estimate comparisons between a plurality of parts makers. When this happens, erroneous NC data is passed to the production division, causing defective printed-circuit boards to be produced.

Also, in the conventional methods, since the NC data inspected through the production by the mounting equipment is sent as the feedback to the CAM system on an irregular basis by man, the conditions for adjusting the parts to the equipment are not reflected onto the database of the CAM system. When this happens, an erroneous parts library is loaded onto the mounting equipment, and defective printed-circuit boards are produced.

Furthermore, though, as stated earlier, high productivity is required for the printed-circuit board mounting process, and the downtime of the line should be as short as possible to increase the productivity, and a restless, continuous operation is ideal, a downtime for changing the NC data is unavoidable. This generates a problem that it takes time to change the board types and reduces the production operation time.

Furthermore, as stated earlier, it takes a lot of time to check whether the NC data has been prepared appropriately for a production plan made by the scheduling system. This is because the production plan may change depending on the sales of the products. This tendency is remarkable in recent days when there are demands for a variety of products with small quantities. A problem arises under these circumstances that when the NC data has not been prepared yet, even if the production plan is changed or the CAM system is urged to make the NC data, the production of the product is delayed, decreasing the production operation time.

SUMMARY OF THE INVENTION

The object of the present invention is therefore to provide an NC data management apparatus and an NC data management method that can be used in a production system to produce high-quality NC data and reduce the time for changing the board types.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 4 shows an NC data registration/management function display screen;

FIG. 5 also shows a production preparation table display screen;

FIG. 8 shows a parts library register/edit/generate function display screen;

FIG. 12 shows the NC management data delete function display screen;

FIG. 15 is a flowchart showing the procedure of a parts library generation function;

DESCRIPTION OF THE PREFERRED EMBODIMENT

The following describes an NC data management apparatus and an NC data management method for a production system, according to a preferred embodiment of the present invention. It should be noted here that in the following description, a printed-circuit board mounting system will be used as an example of the production system, though the present invention may be applicable to other production systems.

First the construction of a printed-circuit board mounting system and general processing of each component executed for part mounting will be explained, then the NC data management apparatus and the NC data management method will be described in detail.

1. Construction of Mounting System 1.1 General Outline of Mounting System

Figure 1:
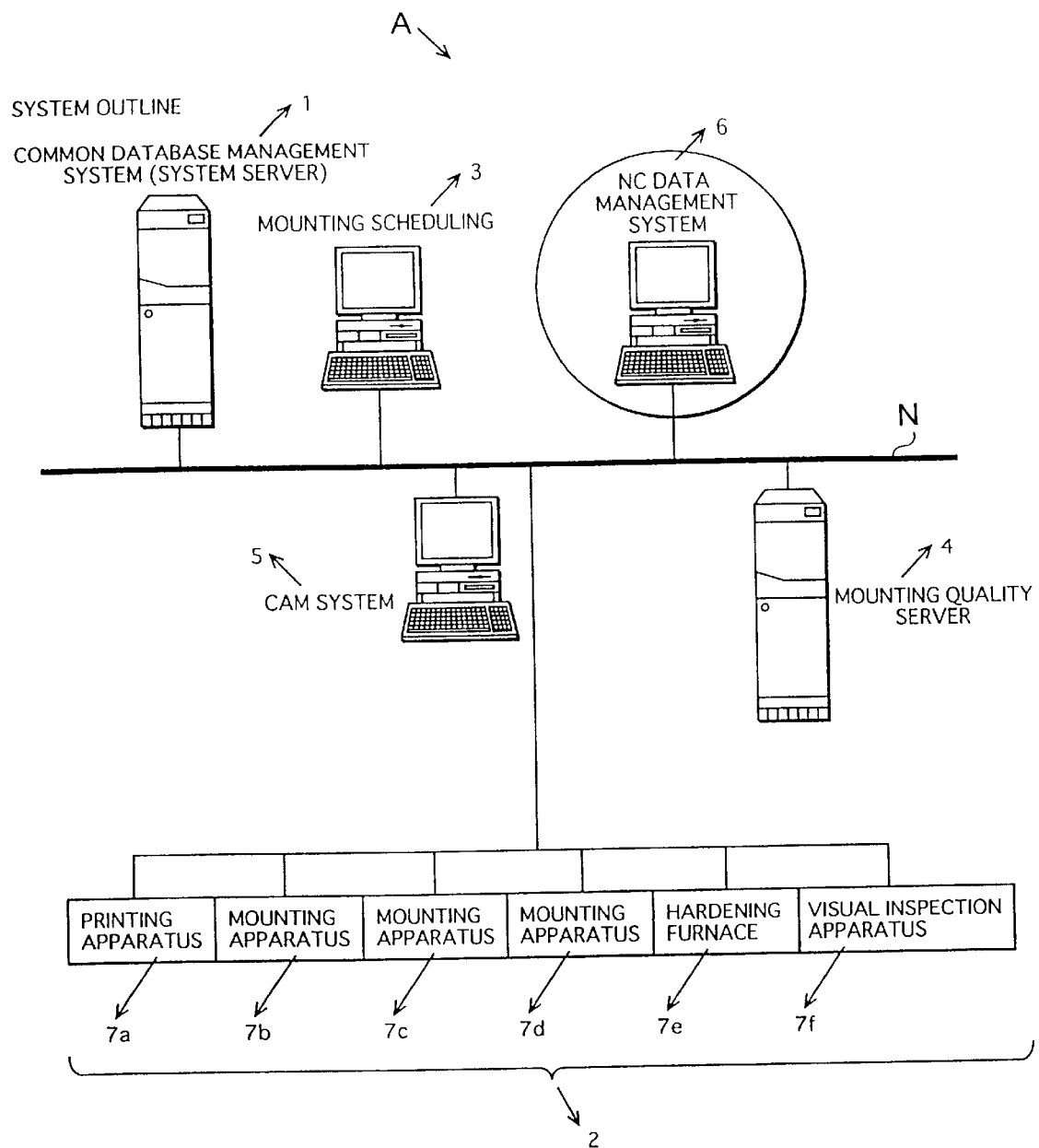
FIG. 1 shows the general outline of the printed-circuit board mounting system and the NC data management apparatus.

FIG. 1 shows the general outline of the mounting system A in the present embodiment.

Roughly speaking, the mounting system in the present embodiment is composed of a system server (a common database management system, or a database server) 1, a mounting line 2, a scheduling system (mounting scheduling apparatus) 3, amounting quality server 4, a CAM system 5, and an NC data management system 6. These components of the system are connected with each other via a network N, and can communicate bi-directionally with each other.

Each of the above components is a computer system having a microprocessor, a ROM, a RAM, a LAN board or the like. The RAM stores a computer program. Each component performs its function when the microprocessor acquires, interprets, and executes the computer program.

The system server 1 manages the process of a production in a mounting system A of the printed-circuit board. The management by the system server 1 includes NC data management.

The mounting quality server 4 manages, for each board, each part, and each circuit number, the visual inspection results output as a result of visual inspections on the produced printed-circuit boards by a visual inspection apparatus 7f.

The mounting line 2 performs the printed-circuit board production process under the control of the system server 1. The mounting line 2 is composed of a series of apparatuses arranged along a conveyer, the series of apparatuses including an apparatus 7a for printing solder onto a printed-circuit board, apparatuses 7b to 7d for mounting electronic circuit parts (hereinafter the apparatuses 7b to 7d are referred to as mounting equipment), an apparatus 7e for hardening the electronic circuit parts mounted on the board, a visual inspection apparatus 7f for performing a visual inspection on the produced printed-circuit board, or the like. Each of the apparatuses 7a to 7f making up the mounting line 2 has a controller that is connected with the system server 1 via a LAN N. In the present embodiment, only one mounting line is illustrated. However, in reality, one mounting system may include a plurality of lines. The present invention does not exclude such other cases.

Each of the mounting equipment 7b to 7d has (a) a plurality of cassette positions which cassettes, which are used to supply parts to each equipment, are attached to and detached from, and (b) a rotary head that sucks up a supplied part from a cassette, transfers and mounts the part onto the board. One cassette supplies one part to the rotary head. The reason why a plurality of pieces of mounting equipment are required is that the number of cassettes that can be attached to one piece of mounting equipment is not enough to mount all parts onto the board. The number of pieces of mounting equipment is determined based on a printed-circuit board on which the largest number of parts are mounted. As a result, part of the mounting equipment may not be used in the case where a printed-circuit board, on which a small number of parts are mounted, is to be produced.

The NC data management system 6 manages the NC data that is used by the whole system or by each mounting equipment of the line. Now, the system server 1, the mounting line 2, and the NC data management system 6 will be described in terms of their construction and processing. Information generated for the management processing including the NC data management will also be explained.

1.2 Construction of System Server

The system server 1 uses production preparation table information as the basic information in managing the production of a printed-circuit board by the mounting system. In the present embodiment, the production preparation table information is used to determine when and in what equipment the NC data should be prepared. Generally, execution of one production plan requires approximately one week.

Figure 2:
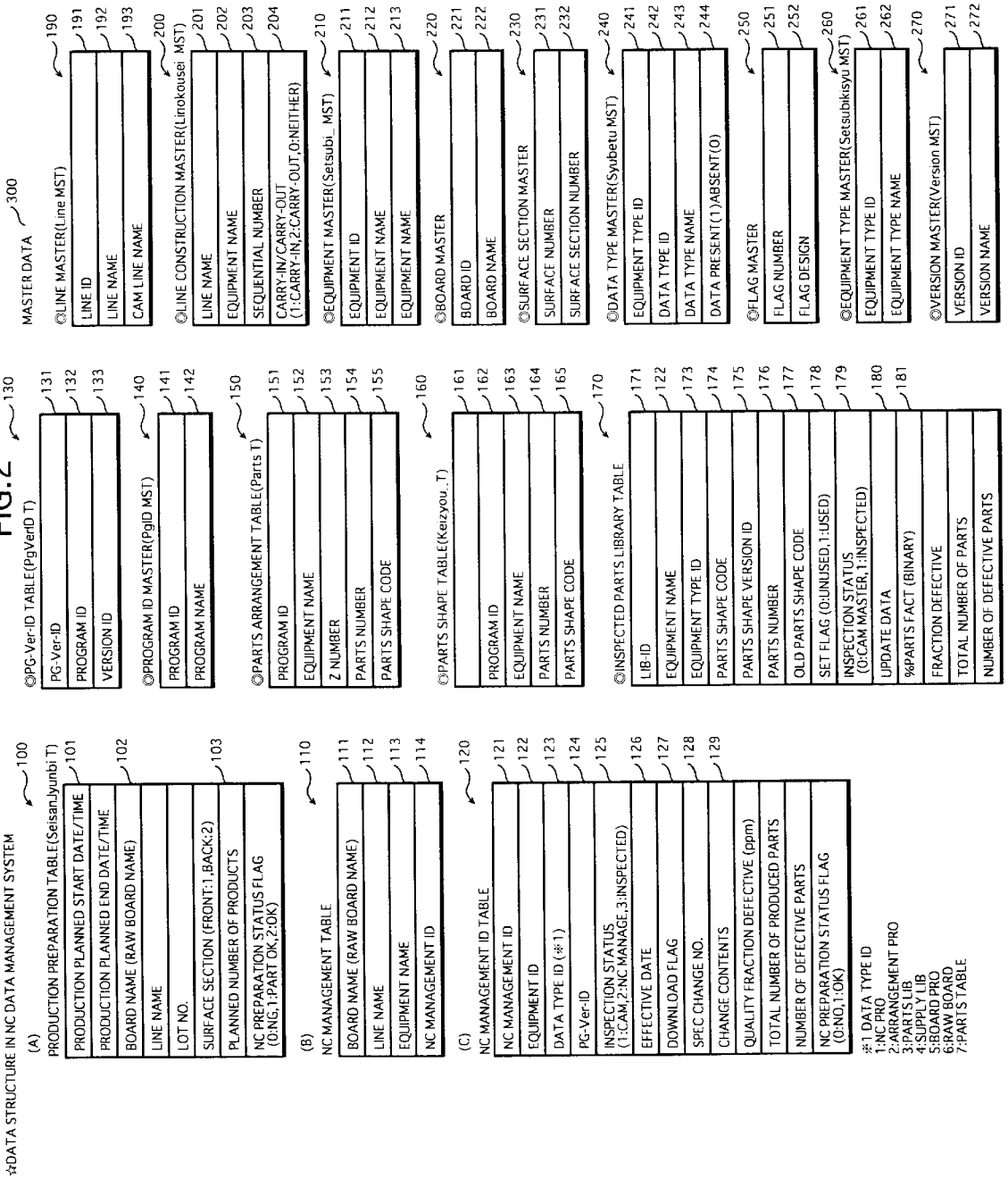
FIG. 2 shows a data structure in the NC data management apparatus.

FIG. 2 shows tables which have different pieces of data used by the NC data management system for the management.

The table (A) shown in FIG. 2 is a production preparation table 100. The production preparation table 100 is created based on a production plan by the scheduling system 3, and transmitted to the system server 1 via the network N. That the production preparation table 100 is incorporated into the system server 1 is characteristic. This enables the master data for each line or equipment to be checked immediately against the production preparation table 100. With this arrangement, it is possible to immediately recognize parts, tools or other items required for the planned production. Incidentally, in conventional systems, the system server acquires the production preparation table offline.

The production preparation table 100 includes items such as a production planned start date/time 101, a board name 102, and a planned number of products 103, as shown in the table (A) in FIG. 2. The item "board name" 102 shows the name of the type of the printed-circuit board to be produced. The item "planned number of products" 103 shows the number of products to be produced for each board type.

The table shows detailed information. For example, the table may show that 5000 printed-circuit boards of "ABC-1" type, 2000 printed-circuit boards of "ABC-2" type, and 3000 printed-circuit boards of "ABC-3" type are planned to be produced. If the products are to be produced in sequence, the production preparation table 100 shows all information necessary for the sequential production.

In addition, the production preparation table 100 has mounting information that shows each equipment's share of work load (what equipment mounts what part) that is identified by the line ID, as shown in the table (A) in FIG. 2.

The table (B) in FIG. 2 is an NC management table 110. The NC management table 110 shows the work currently performed by each equipment in each line. The management information is very large in amount. As a result, the drawing shows only a part of the management information.

The NC management table 110 at least contains items such as a board ID 111, a line ID 112, an equipment ID 113, an NC management ID 114, as shown in the table (B) in FIG. 2. The information in this table enables one to recognize what equipment in what line is operating for producing a certain board, and the version of the used program. The NC management ID 114 is a pointer pointing to an NC management ID table 120.

The NC management ID table 120 contains items such as an NC management ID 121 being a pointer number, an equipment ID 122, a data type ID 123, a PG-Ver-ID master 124, an inspection status 125, an effective date 126, a download flag 127, a spec change No. 128, and contents of change 129. These information indicate equipment used for mounting onto a certain board, data type used for operation, used program, production deadline, whether or not data has been downloaded from a database, and an identification number of a specification change.

The PG-Ver-ID table 130 contains items such as a program version number (PG-Ver-ID) 131, a program ID 132, and a version ID 133 of the program.

The program ID master 140 contains items such as a program ID 141 and a program name 142.

The parts arrangement table 150 contains items such as a program ID 151, an equipment ID 152, a Z number 153, a parts number 154, and a parts shape code 155.

The parts shape table 160 contains items such as a parts shape ID 161, a program ID 162, an equipment ID 163, a parts number 164, and a parts shape code 165.

The inspected parts library table 170 contains items such as an LIB-ID 171, an equipment ID 172, an equipment type ID 173, a parts shape code 174, a parts shape version ID 175, a parts number 176, an old parts shape code 177, a set flag (0: unused, 1: used) 178, an inspection status (0: CAM master, 1: inspected) 179, an update date 180, and a % PARTS fact (binary) 181.

The master data 300 is divided into a line master 190, a line construction master 200, an equipment master 210, a board master 220, a surface section master 230, a data type master 240, a flag master 250, an equipment type master 260, and a version master 270.

The line master 190 contains a line ID 191, a line name 192, and a CAM line name 193.

The line construction master 200 contains a line name 201, an equipment name 202, a sequential number 203, and a carry-in/carry-out (1: carry-in, 2: carry-out, 0: neither) 204.

The equipment master 210 contains an equipment ID 211, an equipment name 212, an equipment IP address 213, an equipment type ID, and a CAM equipment name.

The board master 220 contains a board ID 221 and a board name 222.

The surface section master 230 contains a surface number (0: front, 1: back) 231 and a surface section name 232.

The data type master 240 contains an equipment type ID 241, a data type ID 242, a data type name 243, and a data present (1) absent (0) 244.

The flag master 250 contains a flag number 251 and a flag design 252.

The equipment type master 260 contains an equipment type name 262.

The version master 270 contains a version ID 271 and a version name 272.

Figure 3:
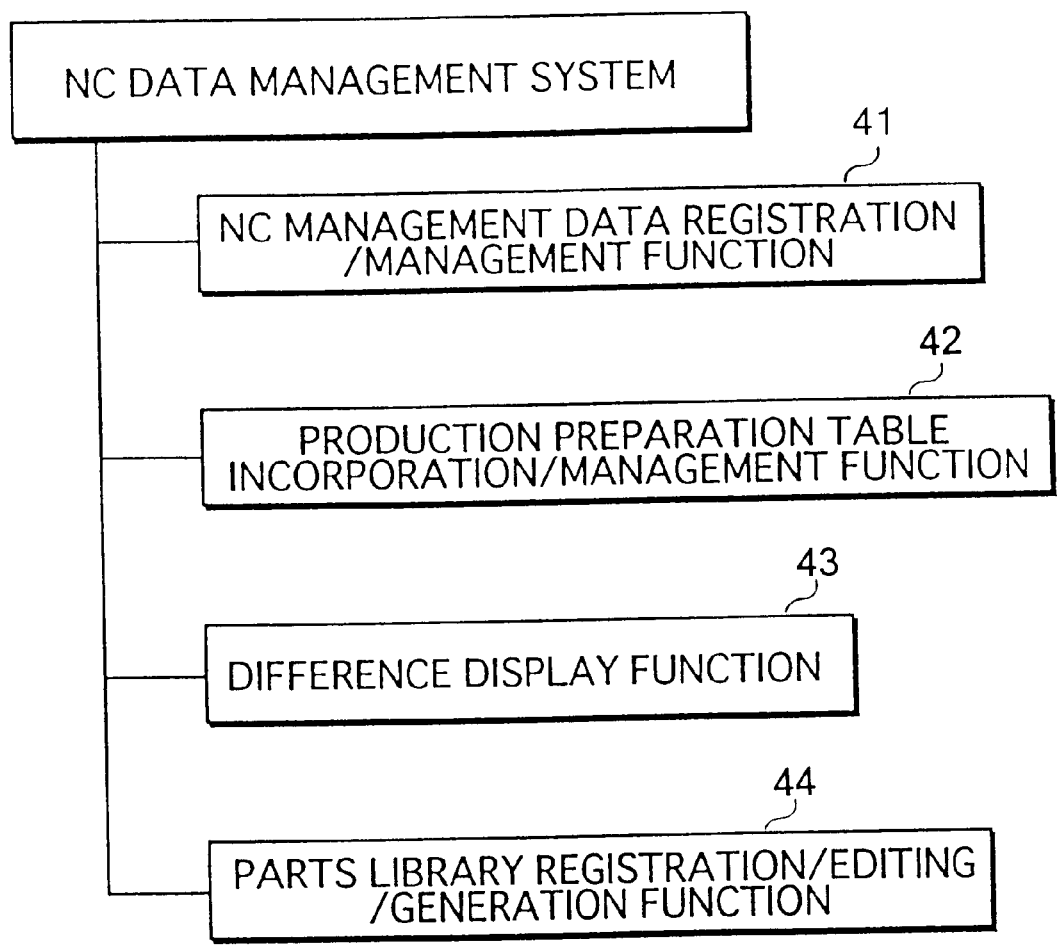
FIG. 3 shows the functions in the NC data management apparatus.

FIG. 3 shows the function construction in the NC data management system.

As understood from FIG. 3, the NC data management system has an NC management data registration/management function 41, a production preparation table incorporation/management function 42, a difference display function 43, and a parts library registration/editing/generation function 44.

The NC management data registration/management function 41 is executed to incorporate the NC data created by the CAM 5 shown in FIG. 1 into the NC management apparatus 6, and manage the incorporated data. The NC management data registration/management function 41 is divided into an NC management data display function 411, an NC management data add/register function 412, an NC management data edit function 413, and an NC management data delete function 414. Now, each of these functions will be described with reference to the display screen shown in FIG. 4.

(1) NC Management Data Display Function 411

FIG. 4 shows a display screen of the NC management apparatus 6. In FIG. 4, the display screen is shown within the frame, and the terms appearing in the display screen are explained outside the frame. In the upper row of the screen, buttons a1, a2, a3, and a4 are provided for selection of items "data type", "board name", "line name", and "equipment name", respectively. Under this row, buttons b1 to b5 are provided for "display", "add", "edit", "delete", and "register", respectively. The lower half of the screen is occupied by a table listing the NC management data.

When a user presses the data type button a1, the board name button a2, the line name button a3, and the equipment name button a4 to set corresponding columns in the table and presses the display button b1, the data is output to the NC management screen. FIG. 4 shows the screen displaying the set contents.

In the table shown in FIG. 4, if the day on which the user inputs data has not reached the effective date, the effective date is reversed and displayed red. Also, if a check flag is not turned on for any of requested board name, line name, equipment name, and data type, the check column is reversed and displayed red. The NC management data display function 411 also obtains the quality fraction defective for the same program name and a board ID of a board having been produced in the past from the mounting quality server 4, and displays the obtained quality fraction defective on the NC management screen.

Figure 9:
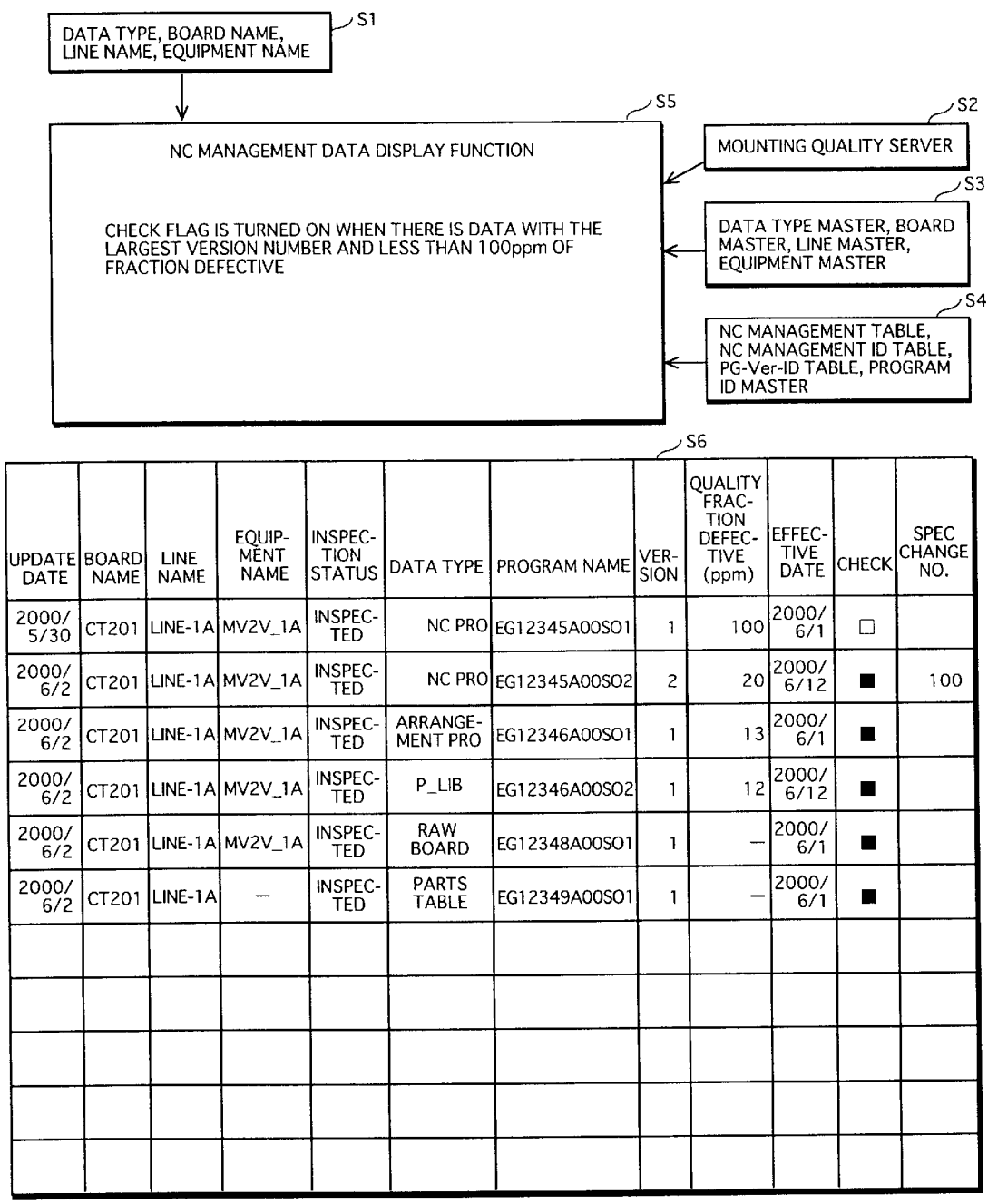
FIG. 9 is a flowchart of an NC management data display function.

Detailed of the above process is shown in the processing flow shown in FIG. 9. In FIG. 9, S1 represents the input process, S2, S3, and S4 represent the process of reading data from each master, S5 represents the process in which the NC management data is generated from the data acquired through S1–S4 and displayed. S6 represents a screen displaying the NC management data. The contents of this screen is the same as the table shown in FIG. 4.

(2) NC Management Data Add/Edit/Register Function 412

Figure 10:
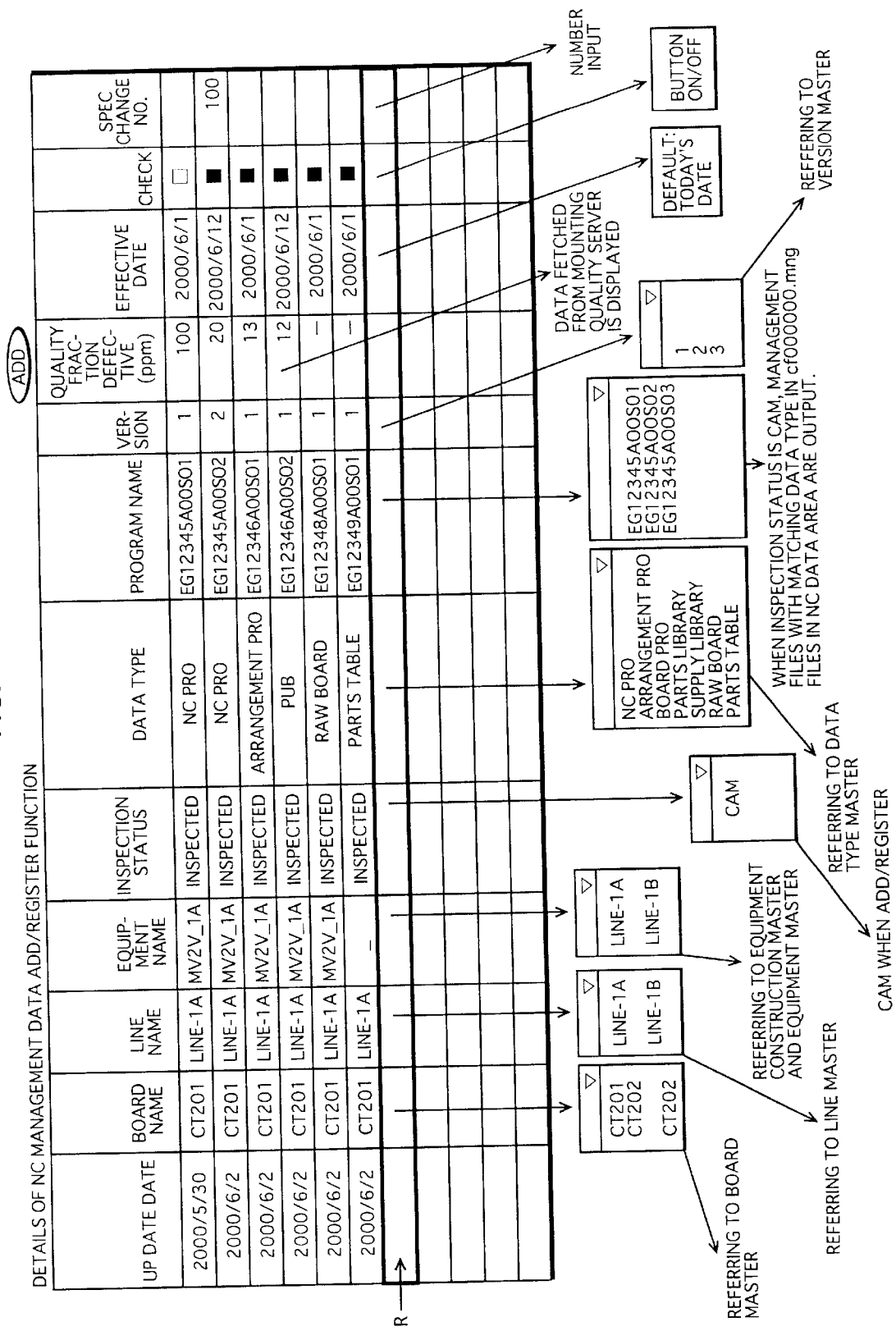
FIG. 10 shows the NC management data add/register function display screen.

When the "add" button b2 is pressed on the screen shown in FIG. 4, one record can be added on the screen. FIG. 10 shows the NC management screen displayed after the add button b2 is pressed. In FIG. 10, a row encircled by a thick line represents an added record R. For the record R, a board name, a line name, and an equipment name are selected for the respective columns from the displayed corresponding masters, CAM is displayed as a default in the inspection status column, and a data type and a program name are selected for the respective columns from the displayed contents of the NC data area for the CAM. After the contents of the added record R is set, the user is required to press the enter button (for example, ENTER key provided on the keyboard) to write the added contents to the common database system server 1.

(3) NC Management Data Edit Function 413

When the user wants to modify the displayed records, the user presses the "edit" button b3 on the NC management screen. Ordinarily, the contents planned based on the production preparation table are not modified. This function is provided nonetheless because there is a possibility that it is found during work that a partial modification is preferable.

Modification can be made for the columns of inspection status, program name, Ver, effective date, check, and specification change No. After the editing is completed, the enter button is pressed to write the data to the common database system server 1.

Figure 11:
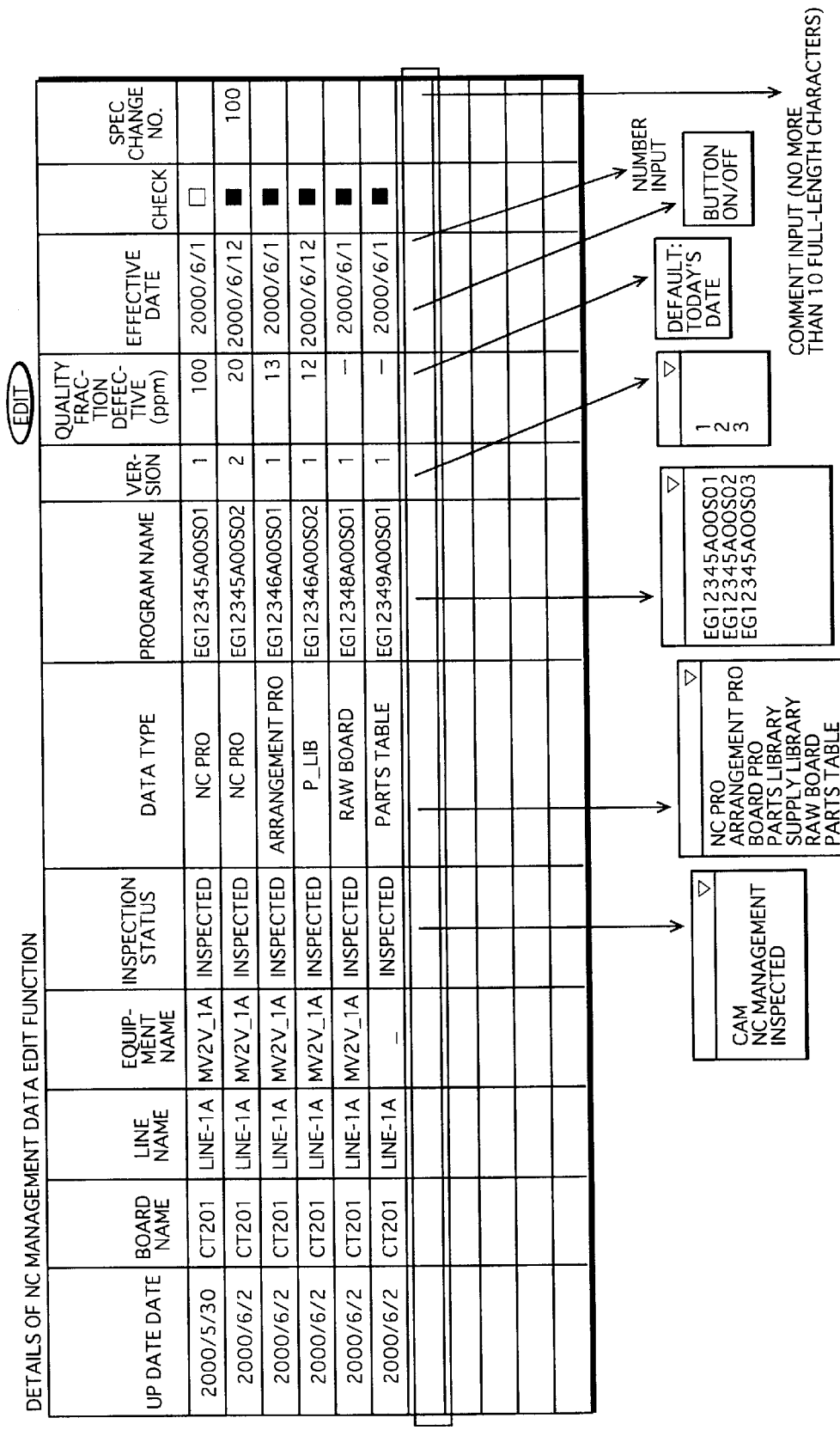
FIG. 11 shows the NC management data edit function display screen.

FIG. 11 shows the screen displayed after the editing button b3 is pressed. The drawing shows that editing of the columns of inspection status, data type, program name, Ver, quality fraction defective, effective date, and specification change is available.

(4) NC Management Data Delete Function 414

When the user wants to delete the currently displayed records, the user presses the "delete" button b4. This causes the specified record to be deleted from the common data base system server 1.

FIG. 12 shows an example in which a row encircled by a thick line represents the record R selected for deletion.

(5) Production Preparation Table Incorporation/Management Function 42

Now, the production preparation table incorporation/management function 42, which is one of the functions shown in FIG. 3 provided in the management system, will be described. As described earlier, the production preparation table is created by the scheduling system 3. The table is incorporated into the NC data management system 6 by the user, and the system 6 displays the table on the screen. The user incorporate the table by pressing the menu button on the upper right side of the screen to display line names, and selects one among the displayed line names. FIG. 5 also shows a display example of the incorporated production preparation table.

Figure 13:
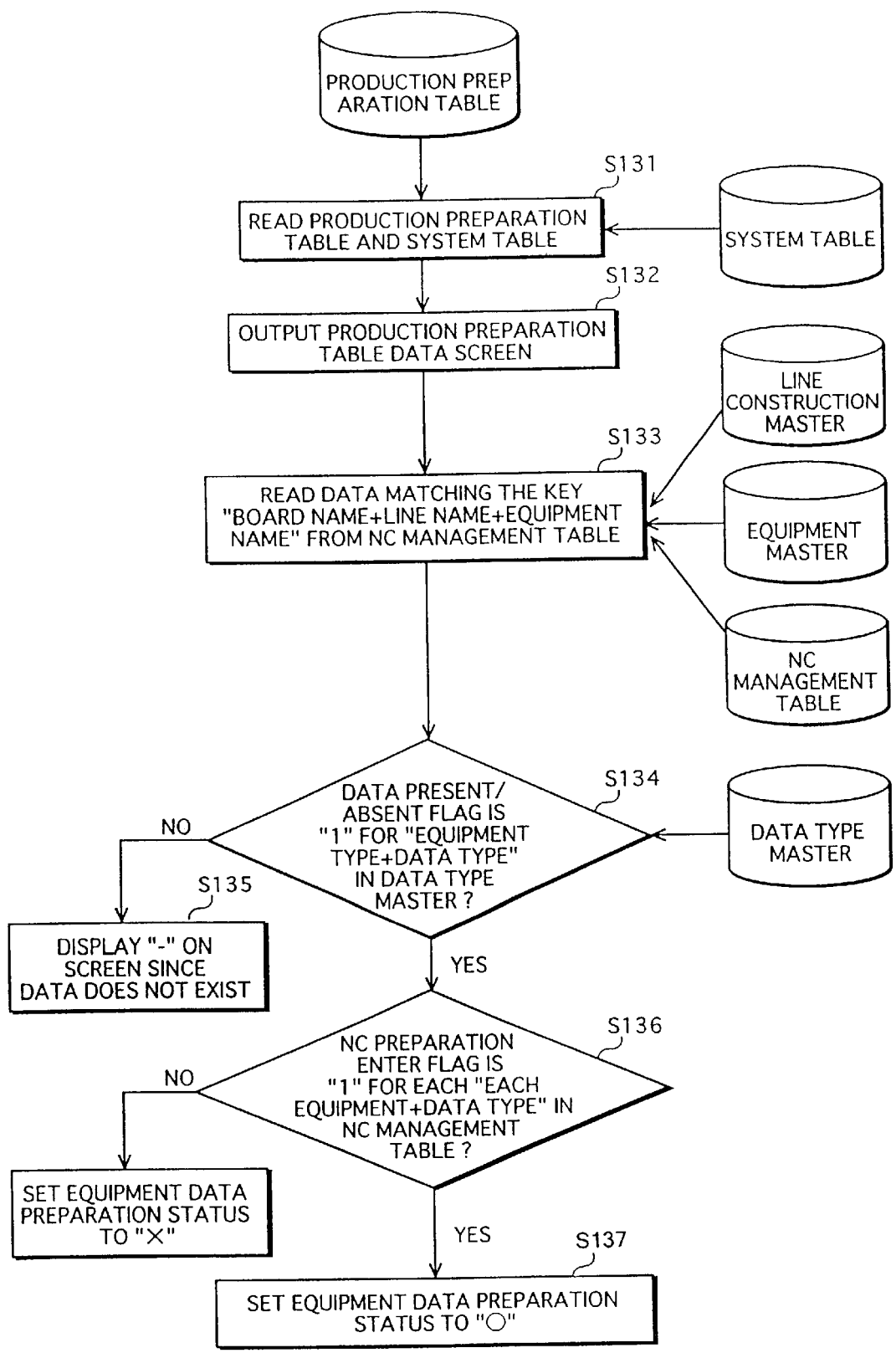
FIG. 13 is a flowchart showing the procedure of a production preparation table incorporation/management function.

FIG. 13 is a flowchart showing the procedure of the incorporating. The procedure will be detailed later. Here, mainly the operation of the user in incorporating the production preparation table will be described.

(1) First, when the user inputs an instruction to fetch the production preparation table for a period from X days before to X' days after the date of month M day N (today) (environmental setting) from a common database 1, write the table to the local database, and display the table on the main screen, the NC data management system 6 reads the production preparation table and the system table from the system table.

(2) Immediately after the above operation is completed, the production preparation status and the NC preparation status for each equipment are displayed at the same time on the main screen (a screen shown on the left-hand side of FIG. 5).

(3) The user, watching the displayed production plan, selects the batch download button Db provided in the table.

(4) The NC management apparatus 6 then searches the NC data belonging to a period of the production start date up to (N+Y) days after (environmental setting), and if all the necessary data is not found, reverses the NC preparation status column and displays it red on the screen.

(5) On the other hand, if the NC data has been downloaded, the NC management apparatus 6 reverses the batch download button column for the production preparation data and displays it blue.

Now, the procedure of incorporating the production preparation table will be described with reference to the flowchart shown in FIG. 13.

Main Flow (M–1) After the user presses the production preparation table button (not illustrated), the environment setting table (system-MST) stored in the system table is referred to and the output range of the production preparation table corresponding to a period between the production start day and the production end day is determined, and the production preparation table and the system table are read (step S131). Then, the enter flag F of the production preparation table is referred to and one of the following two processes is executed depending on the value of the enter flag F.

(1) When the enter flag F is "0", the production preparation table (common database) for the specified period including the production start date, lot No., board name, board number, surface section, line name, and the number of products is displayed on the screen (step S132). Here, only the board master refers to the production preparation table and assigns the board IDs to board masters automatically and sequentially from the board names.

(2) When the enter flag F is "1", the production preparation ID table and the production preparation version table are incorporated, and the tables are displayed on the screen.

(M–2) The following points are checked on each record contained in the displayed production preparation table.

From the board ID (board master) and the line ID (line master), the line construction master is referred to and the equipment ID is obtained.

From the board ID and the line ID and the obtained equipment ID, the NC management tables that match "board ID+line ID+equipment ID" are obtained (step S133).

If no such NC management tables are obtained, the NC preparation status flag of the production preparation table is set to "2".

If one or more such NC management tables are obtained, the following steps are executed in sequence.

(1) The NC management ID tables having the NC management IDS are obtained.

(2) All the data type IDs 1–7 are referred to, then the following steps are executed (here, the data type master is searched for "equipment type ID+data type", and only "1" out of the data present (1) absent (0) is displayed. In the case of absent (0), "–" is displayed, indicating that the data does not exist) (steps S134, S135).

(3) When there is a record with the enter flag "1" and the effective date is the current day or earlier (step S136), sign "○" is displayed on the sub-screen as the equipment data preparation status, indicating that the equipment data has been prepared (step S137).

(4) Regarding the parts table (data type ID: 7), when there is a record with the enter flag "1" and the effective date is the current day or earlier, sign "○" is displayed on the main screen as the parts table preparation status, indicating that the parts table has been prepared.

In this flow, it is judged whether there is a record matching "NC management ID+equipment ID+data type".

Regarding the parts table (data type ID: 6), when there is a record with the enter flag "1", sign "○" is displayed on the main screen.

After the above processes, the production preparation ID table and the production preparation version table are created.

When the enter flag "1" is found to be attached, the production preparation ID table and the production preparation version table are modified.

(M–3) The button for a production plan record desired to be downloaded with the batch download is set so that the button can be turned ON/OFF ("Db" in FIG. 5). When the batch download is attempted in another menu, the ON/OFF of the button is checked.

(M–4) After (M–2) is performed, when some data is missing after NC-READY-DAY in the environment setting table (system-MST) (when the NC data preparation status flag is "0" or "1"), the NC data preparation status column is reversed and displayed red.

(M–5) When the download end flag in the local database production preparation table is "1", the batch download button column is reversed and displayed blue. (The description of the procedure of processing the production preparation table ends.)

Difference Display Function 43

Figures 6A, 6B:
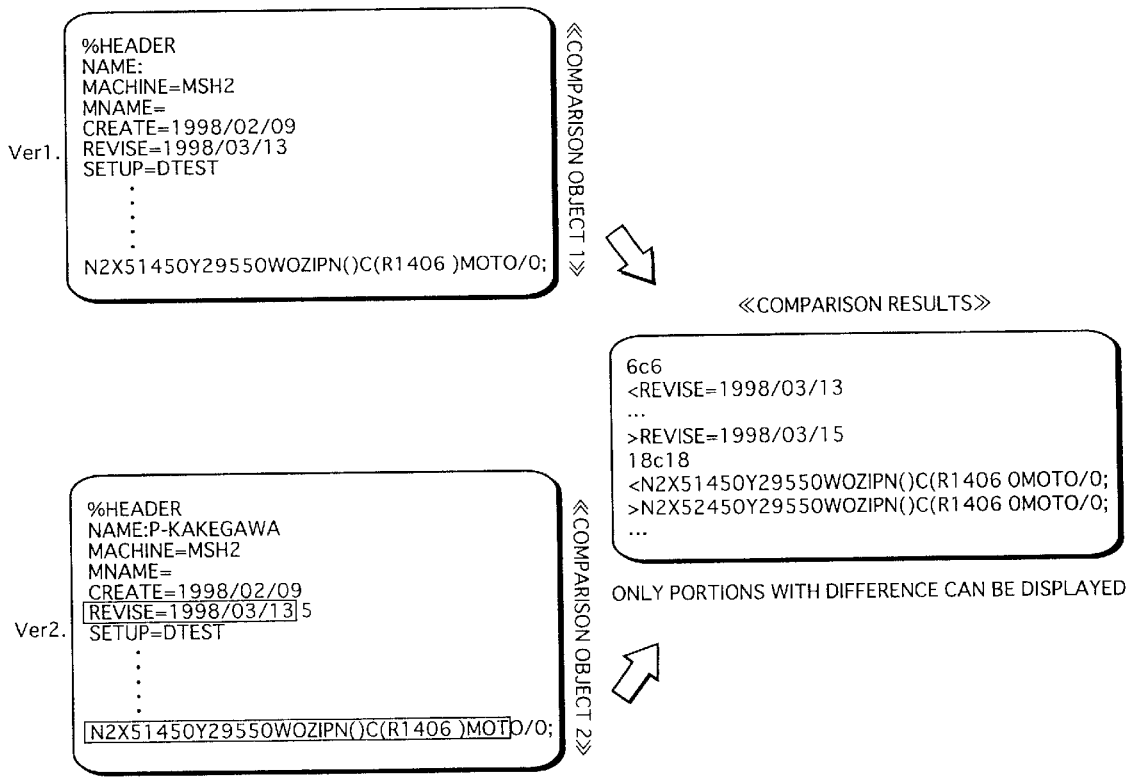
FIG. 6 shows an NC data difference function.

The difference display function fetches two pieces of data in terms of the management No., equipment name, and data type in the production preparation table, and outputs the difference between the two pieces of data. FIG. 6 shows an example in which comparisons are made between management No. 3 and No. 6.

More specifically, first, management No. 3 and No. 6 are specified objects to be compared with each other. Also, the equipment name (MPAV2 1A), and data type (parts LIB) are set. Then, the NC management table, the NC management ID table, the PG-Ver-ID table, and the program ID master are searched for a file at C:\inspection_section\line_ID\equipment_ID\data_type_ID\PG-Ver-ID\program_name (EG12345A0osol.POS), a difference tool is automatically activated, and the difference is displayed. FIG. 6 also shows the difference obtained as a result of the search.

Data Management

Figure 7:
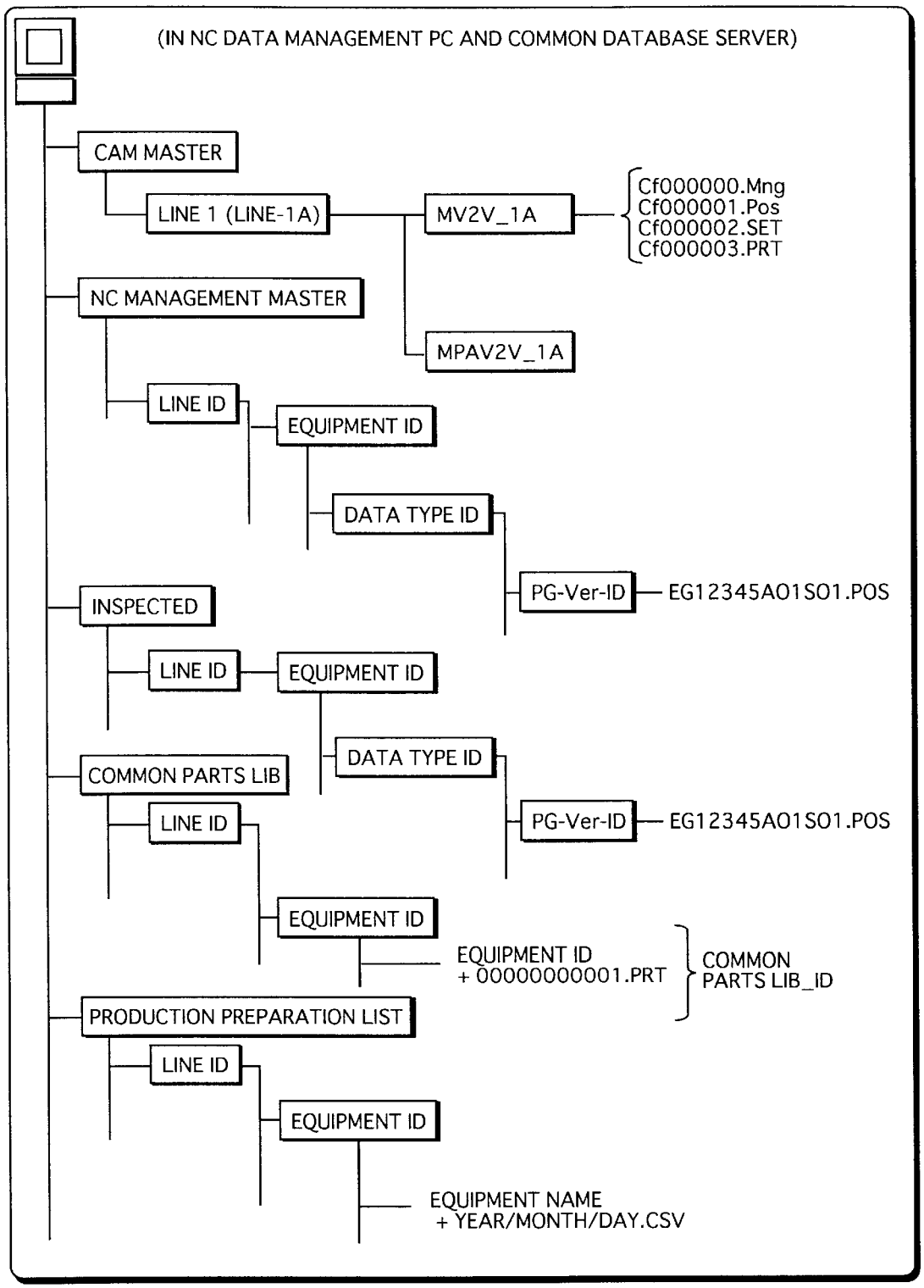
FIG. 7 shows a data hierarchy as a data stringing management function.

The data string management function is performed using the data hierarchy shown in FIG. 7 and the data tables shown in FIG. 2. The data hierarchy shown in FIG. 7 is applied to both the NC management apparatus 6 and the common database management system 1. It is understood from FIG. 7 that the highest layer includes files such as CAM master, NC management master, inspected, common parts library, and production preparation list, and the lower layers include, in the case of the CAM master file, "line 1" file, equipment file "MV2V_1A" or the like. Similarly, in the case of the NC management master file, "line ID" file, "equipment ID" file, "data type ID" file, "PG-Ver-ID" file or the like are stringed sequentially.

Parts Library Registration/Editing/Generation Function 44

Now, the parts library registration/editing/generation function will be described with reference to the user screen shown in FIG. 8. The parts library registration/editing/generation function 44 calculates the parts fraction defective for each of the equipment ID and the parts shape code using the NC management master (registered from the CAM system) and the inspected parts library of the mounting quality server 4. When the inspection section is "inspected" and the fraction defective is 100 ppm, the setting flag is turned ON. Here, the user may select a setting flag. It is also possible with the plural arrangement program selection to generate a parts library from the inspected parts library database. On the production preparation table output main screen (FIG. 5), if the user sets the common library button and executes the lower button, the inspected parts library table in each arrangement program is referred to and a parts library common to the selected production preparation record is generated. The details of the process are described in the processing flow shown in FIG. 15.

FIG. 15 shows the production preparation table shown in FIG. 5. When the common parts setting library button Cb on this table is pressed, the lower table in the drawing is generated, then the process proceeds downward to generate a parts library common to the selected production preparation record.

NC Data Management System

Figure 16:
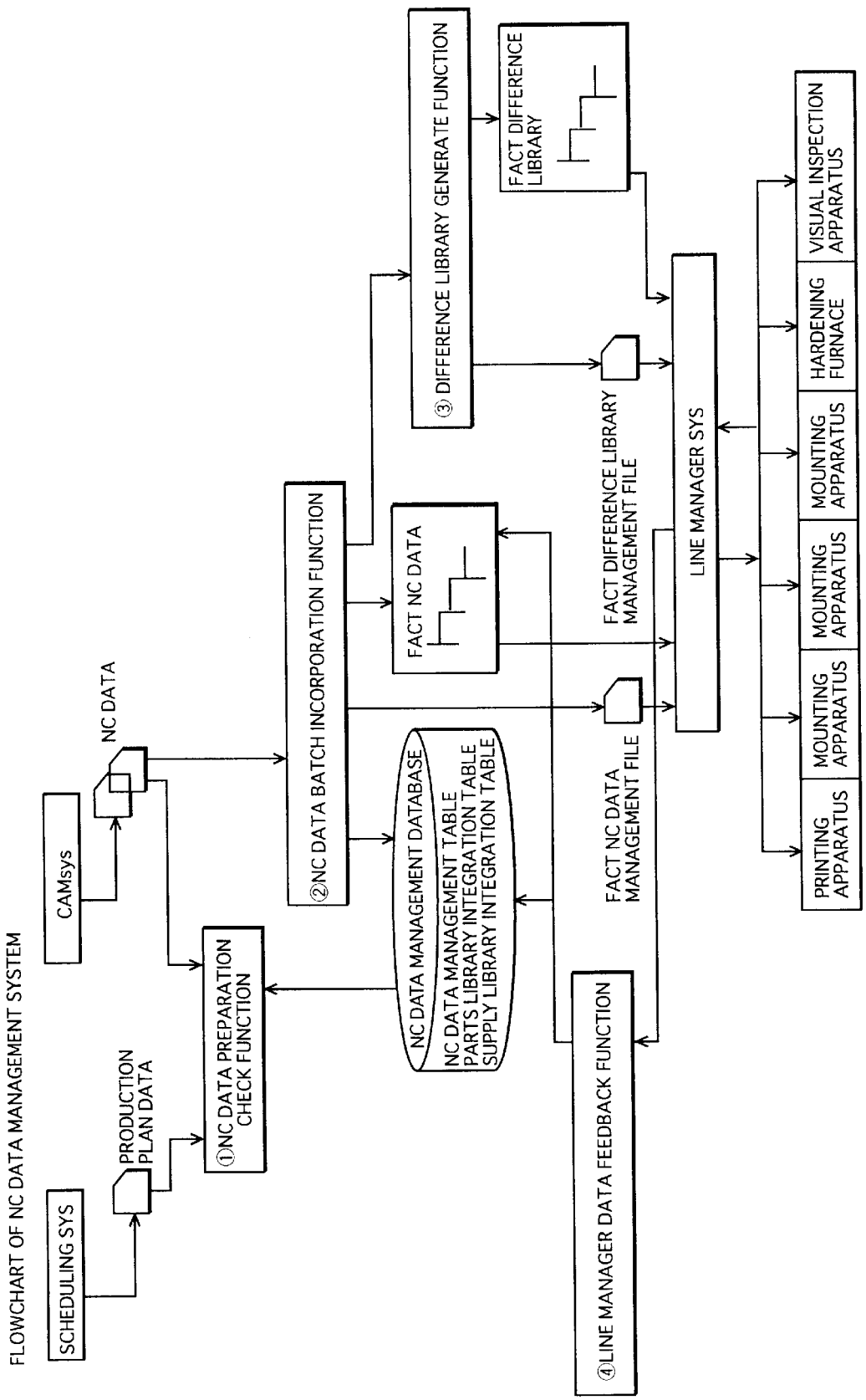
FIG. 16 is a simplified flowchart showing the procedure of the NC data management system.

FIG. 16 is a simplified flowchart showing the procedure of the NC data management system.

Figure 14:
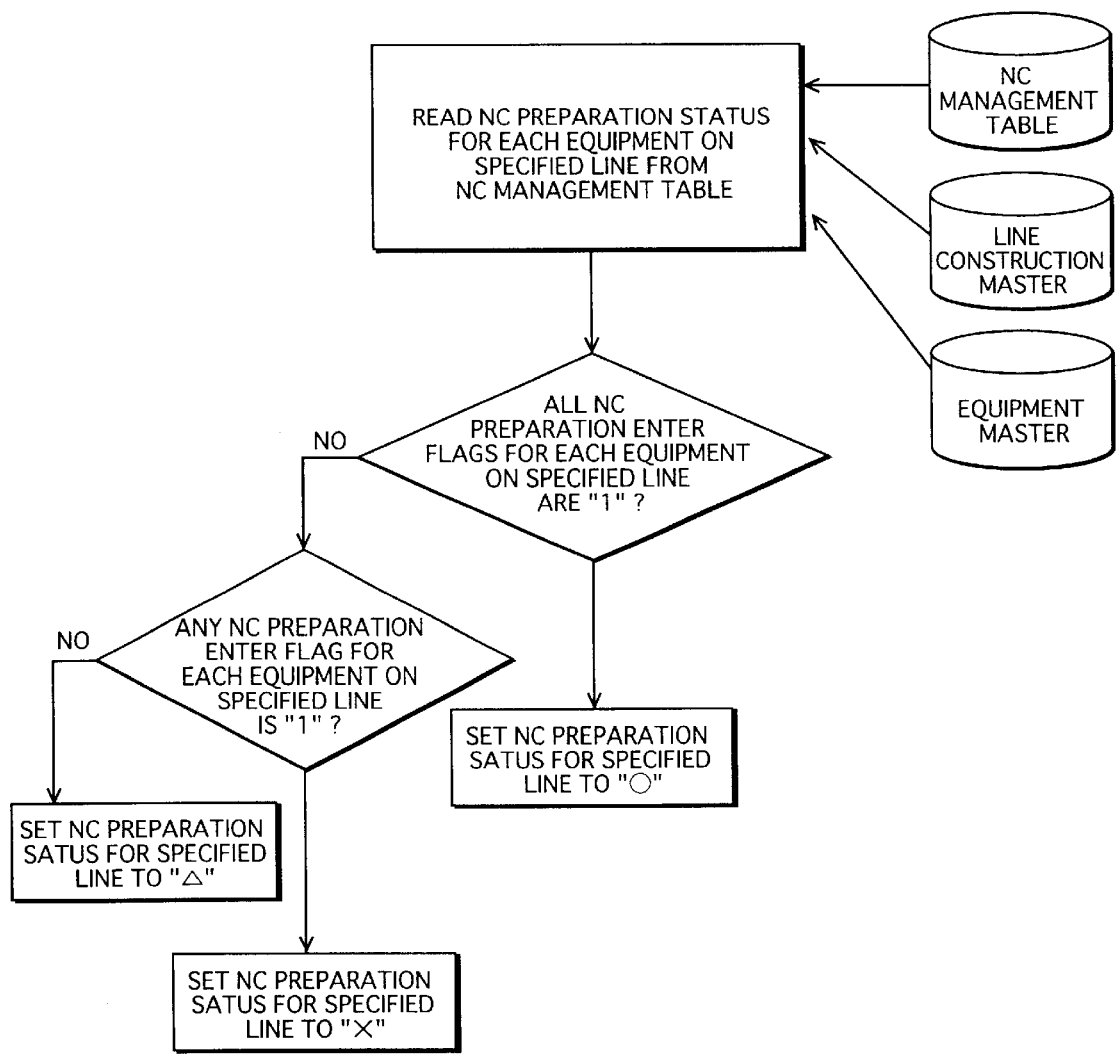
FIG. 14 is a flowchart showing the procedure of a production preparation table incorporation/management function.

While FIG. 1 shows the apparatuses connected to the network N, FIG. 16 shows the functional relationships between them. The ① NC data preparation check function, ② NC data batch incorporation function, ③ difference library generation function, and ④ line manager data feedback function appearing in the drawing are the functions the NC management apparatus 6 has. Of these, the function ① is shown in FIGS. 13 and 14, and therefore the description is omitted here.

Figure 17:
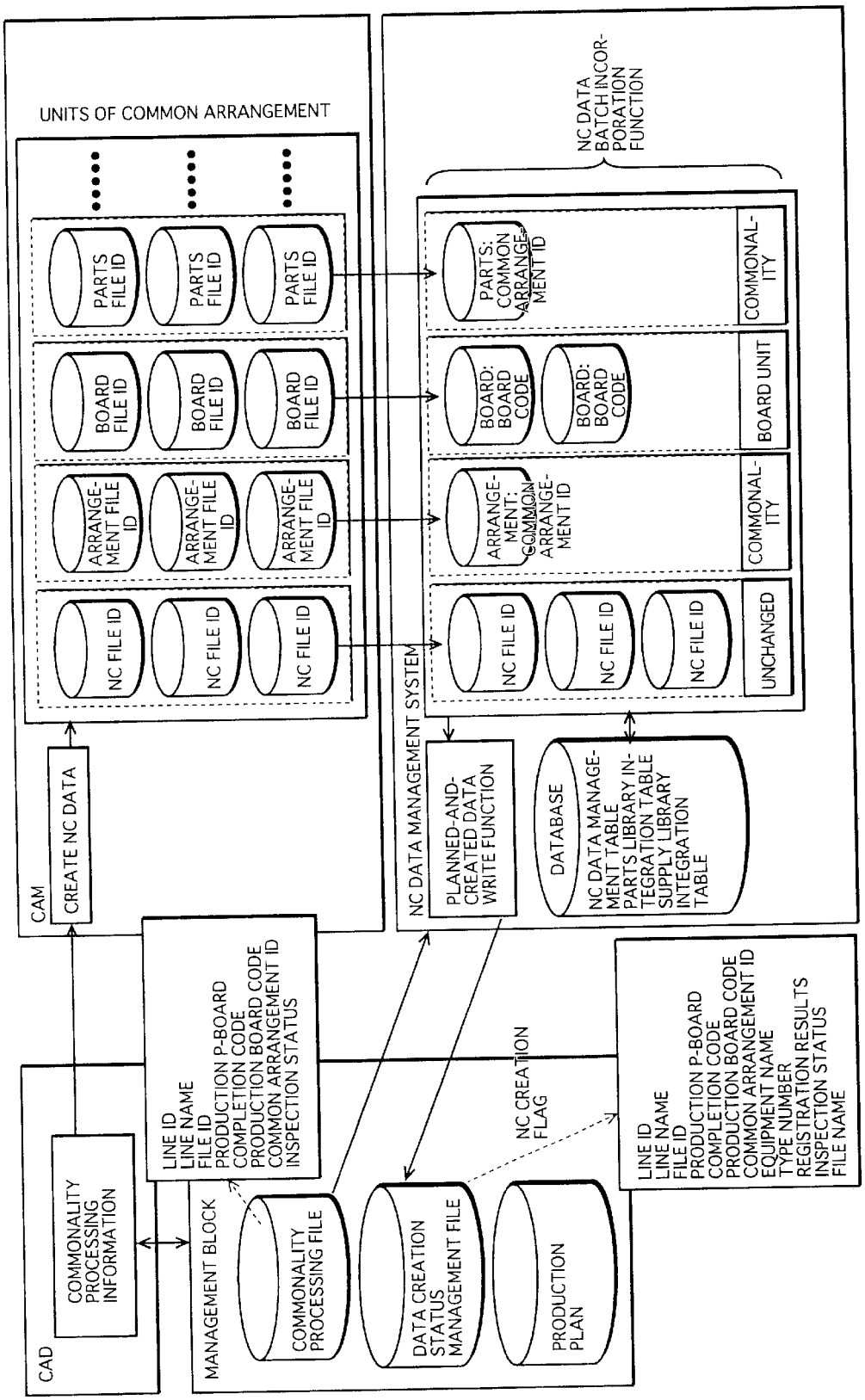
FIG. 17 shows an NC data batch incorporation function.

FIG. 17 shows the ② NC data batch incorporation function. The function reads the commonality processing file from the NC, arrangement, board, parts library, and management block created by the CAM apparatus 5, and combines the arrangements and parts libraries having the same common arrangement ID into one file. The board library is divided in units of boards. The NC library is kept unchanged. The incorporated NC data is written to the management file of the management block by the planned-and-created data write function.

Figure 18:
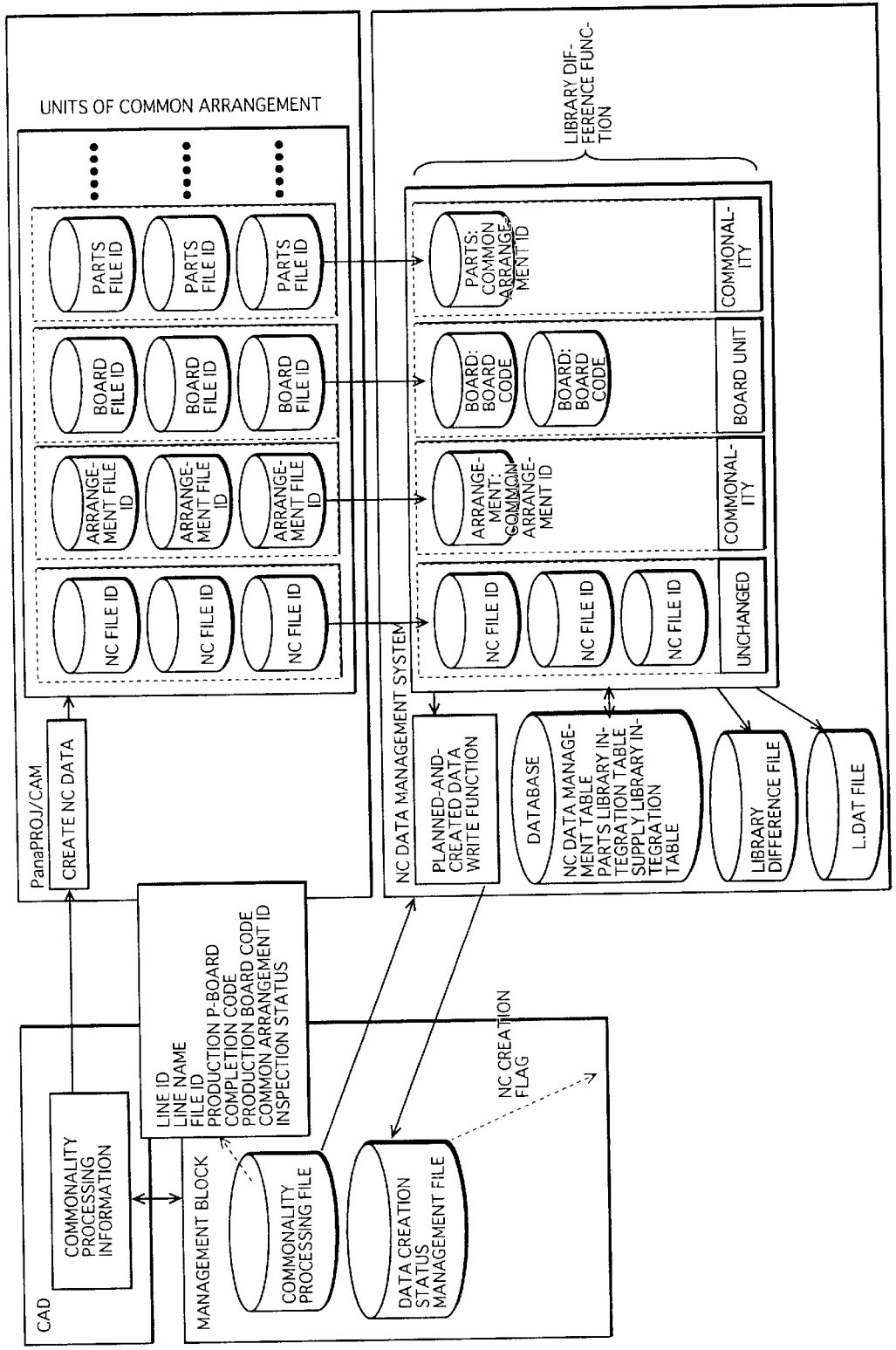
FIG. 18 shows a difference library generation function.

FIG. 18 shows the ③ difference library generation function. The function outputs, as the library difference file, only the parts library data that is registered with the parts library integration table in the NC management database for the first time.

Figure 19:
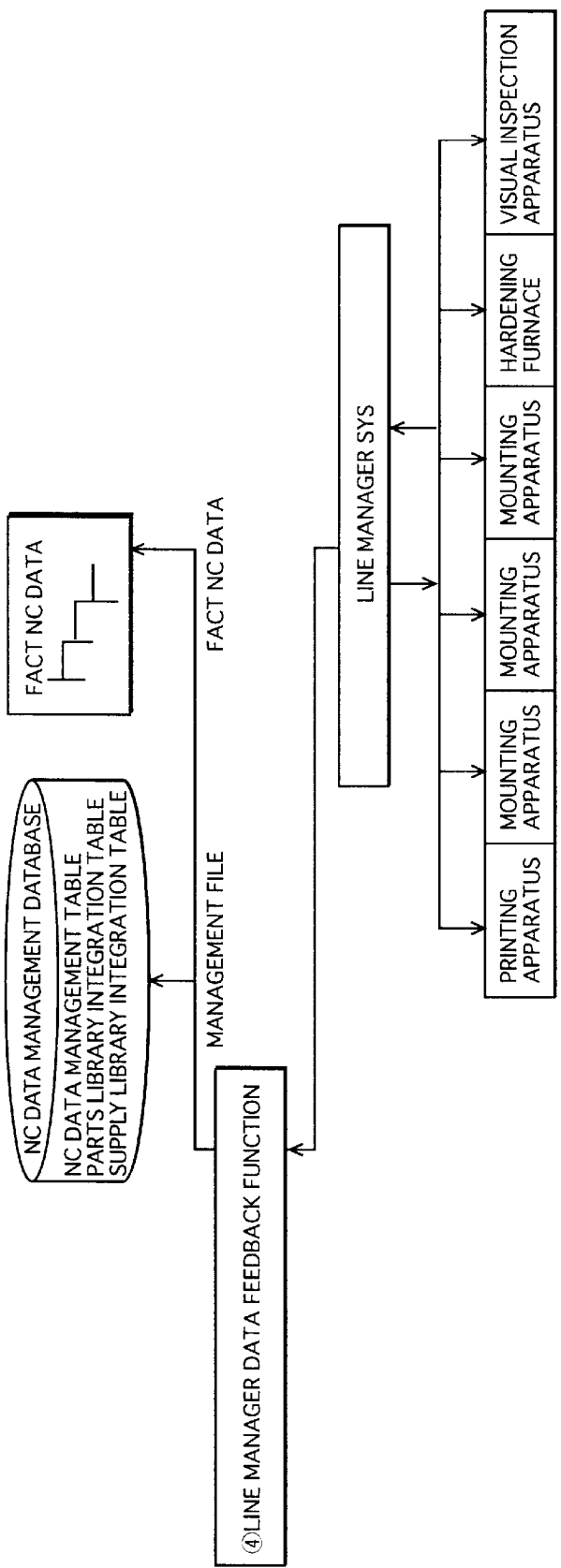
FIG. 19 shows a line manager data feedback function.

FIG. 19 shows the ④ line manager data feedback function. The function sends, as the feedback, the data obtained during actual manufacturing stages in the mounting apparatuses (the data of what parts have mounting defectives, or what boards are difficult for certain parts to be mounted thereon) via the line manager. The data is stored as the fact NC data.

Figure 20:
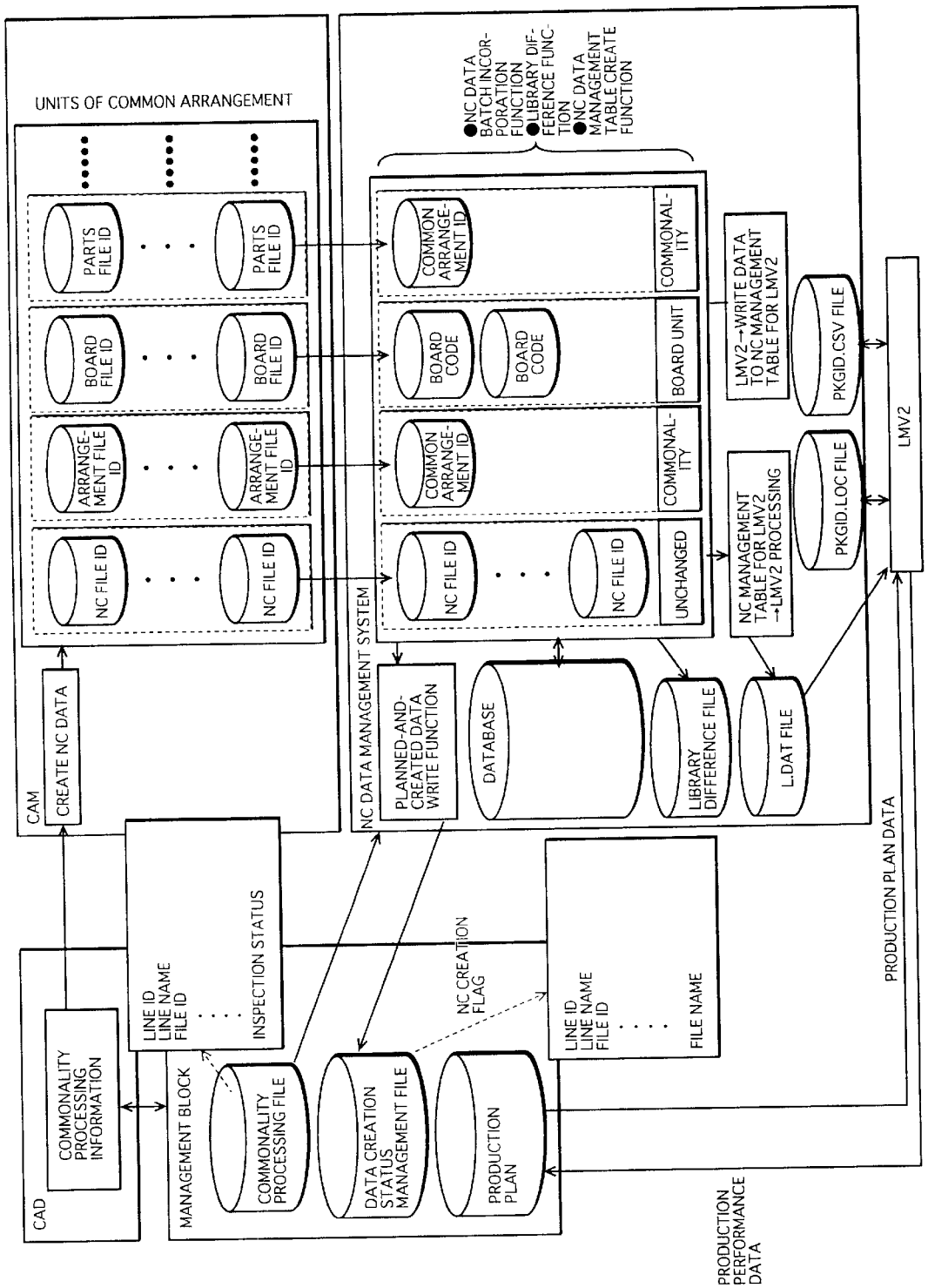
FIG. 20 is a flowchart showing the procedure of the NC data management system.

FIG. 20 is a flowchart showing the procedure of the NC data management system. The flowchart shows details of the simplified system flowchart shown in FIG. 16. FIG. 20 shows the functions shown in FIGS. 17, 18, and 19. in combination.

2. NC Data Management System

The NC data management system improves the efficiency of NC data management work and prevents operation mistake in changing the board (unit) type.

Figure 21:
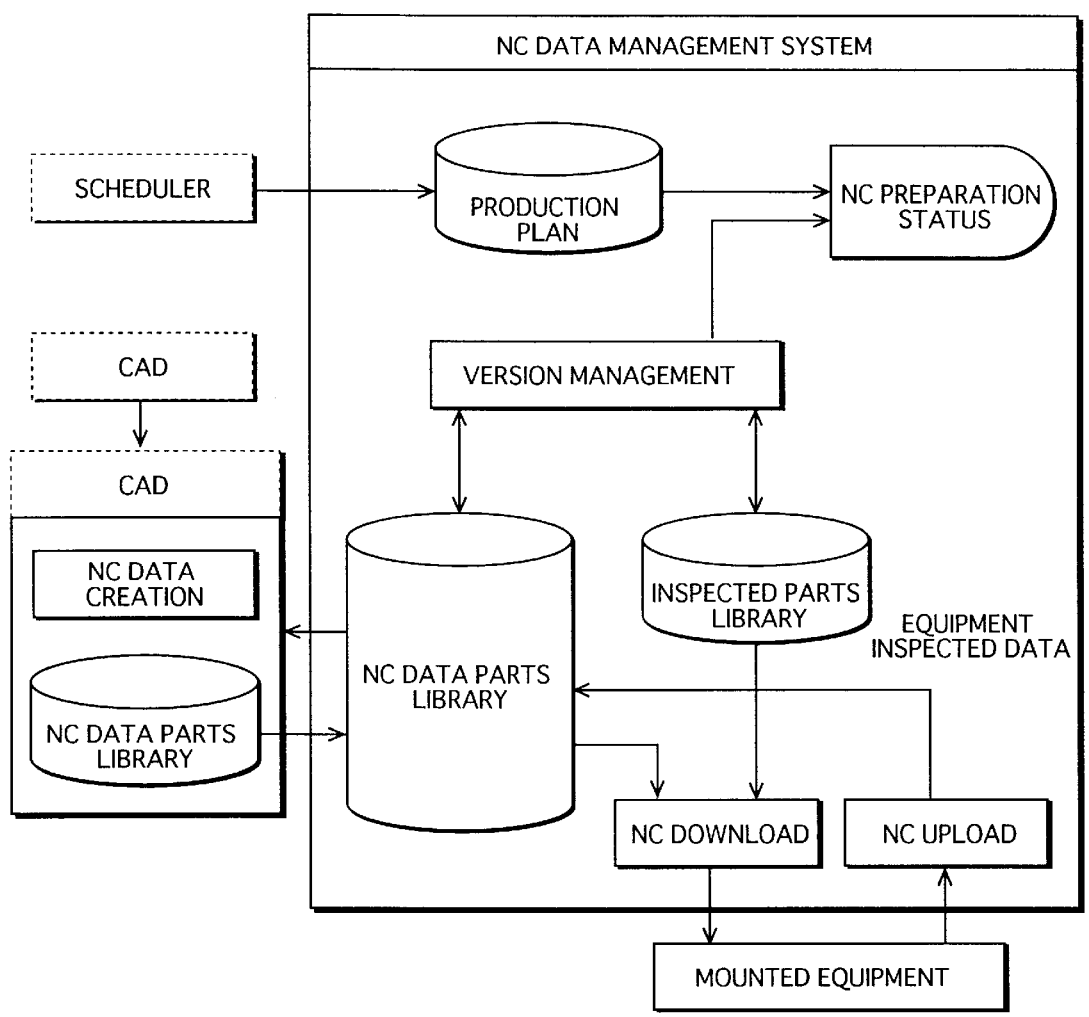
FIG. 21 shows the construction of the NC data management system.

FIG. 21 shows the construction of the NC data management system. FIG. 21 mainly shows the functions of the NC management apparatus 6 shown in FIG. 1. The NC management apparatus 6 is connected to the related systems such as the scheduler or CAM via the LAN, and can incorporate the information generated by each system.

The following are the characteristic features of the NC data management system.

(1) Checking on the NC Preparation Status Based on Production Plan

The NC data management system incorporates the production plan information online that is created by the scheduler 3 or the like, and based on the incorporated information, checks on the preparation of the NC data to be downloaded into each equipment.

(2) Managing Versions of Supplementary NC Data

The NC data management system manages a plurality of versions of NC data, where different versions are generated due to specification changes or due to additional data obtained during actual mounting by the mounting equipment. The NC data management system manages the data assuring the equipment operation quality, as the inspected data. The inspected data can be used when another type of NC data is created, by merging in part or as a whole.

(3) Performing Batch Input/Output of Supplementary NC Data

The NC data management system performs a batch download or upload of NC data with a plurality of pieces of equipment in units of lines, via the protocol conversion apparatus or LAN having been described earlier.

Conclusion

The NC data management apparatus or method described above can be used in a production system to produce high-quality NC data and reduce the time for changing the board types.

The NC data management apparatus or method, in such a production system that includes a production line being a series of a plurality of pieces of production equipment each of which has a parts supply unit, comprises: means for acquiring NC data used for operating each piece of the production equipment; means for acquiring a parts library used for operating each piece of the production equipment; and means for, in a version management managing changes of the acquired NC data in terms of design and production conditions, automatically turning on a check flag that indicates a usable status judging from (a) a version number with which a design specification change is managed and (b) an effective date of data use, using as a key a name of a board or a unit to be produced and a name of equipment.

The above NC data management apparatus or method may further comprise: means for automatically checking on an NC data preparation status of each piece of the production equipment in each line by referring to production preparation table information containing production plan information for each line; and means for outputting a warning and a generation date when the automatic checking means judges that the NC data preparation status is not satisfactory.

The above NC data management apparatus or method may compare NC data generated from design information by a CAM system with inspected NC data that has been adjusted so that each piece of equipment can produce a conforming item, and send data showing results of the comparison to a CAM system master, as a feedback.

The above NC data management apparatus or method may search NC data, which was generated in the past from the acquired production preparation table, for inspected NC data that was generated in the past, using as a key a name of a board or a unit to be produced and a name of equipment, and reuse the NC data.

In the above NC data management apparatus or method, the acquired NC data may be managed in a hierarchy composed of a plurality of layers so that the acquired NC data is stringed between the plurality of layers.

Although the present invention has been fully described by way of embodiment, it is to be noted that the present invention is not limited to the above-described embodiment. The following are also considered to be included in the present invention.

(1) A computer program for causing the above-described method to be achieved by a computer, or digital signals representing the computer program.

(2) A computer-readable recording medium such as a floppy disk, a hard disk, CD-ROM, MO, DVD, DVD-ROM, DVD-RAM, a semiconductor memory or the like in which the computer program or the digital signals are recorded.

(3) The computer program or the digital signals may be transferred via an electric communication line, a radio or a wired communication line, or a network such as the Internet.

(4) A computer system having a microprocessor and a memory, wherein the memory stores the computer program and the microprocessor operates according to the computer program.

(5) The computer program or the digital signals may be recorded in the recording medium and transferred to, or may be transferred via a network such as the Internet to another independent computer system so that the computer program is executed in the computer system.

(6) A combination of the above embodiment and any of the above variations.

As described above, the printed-circuit board mounting system of the present invention includes a production line being a series of a plurality of pieces of production equipment each of which has a parts supply unit, and comprises: means for acquiring NC data used for operating each piece of the production equipment; means for acquiring a parts library used for operating each piece of the production equipment; and means for, in a version management managing changes of the acquired NC data in terms of design and production conditions, automatically turning on a check flag that indicates a usable status judging from (a) a version number with which a design specification change is managed and (b) an effective date of data use, using as a key a name of a board or a unit to be produced and a name of equipment.

With this construction, it is possible to prevent in advance occurrence of an error that NC data is not changed though it is required from a design specification change. This ensures the mounting quality.

The above NC data management apparatus or method may further comprise: means for automatically checking on an NC data preparation status of each piece of the production equipment in each line by referring to production preparation table information containing production plan information for each line; and means for outputting a warning and a generation date when the automatic checking means judges that the NC data preparation status is not satisfactory.

With the above construction, it is possible to prevent any NC data preparation items from omitted and proceed in accordance with the production schedule, and also to delete the mounting equipment loss. This improves the operation efficiency.

The above NC data management apparatus or method may compare NC data generated from design information by a CAM system with inspected NC data that has been adjusted so that each piece of equipment can produce a conforming item, and send data showing results of the comparison to a CAM system master, as a feedback.

What is claimed is:

1. An NC data management apparatus for use in a production line having a plurality of pieces of production equipment each of which has a parts supply unit, the NC data management apparatus comprising:

an NC data acquiring means for acquiring NC data used for operating each piece of the production equipment;

a means for acquiring a parts library used by each piece of the production equipment; and a means for automatically checking on an NC data preparation status of each piece of the production equipment in each line by referring to the acquired NC data, the parts library and a production preparation table that includes production plan information of each line.

2. The NC data management apparatus of claim 1, wherein the automatic checking means instructs to output a warning when the automatic checking means judges that the NC data preparation status is not satisfactory.

3. The NC data management apparatus of claim 2, wherein the acquired NC data is managed in a hierarchy composed of a plurality of layers of at least a line, equipment, data type, and a program version so that the acquired NC data is stringed between the plurality of layers with parameters corresponding to the plurality of layers.

4. An NC data management method for use in a production line having a plurality of pieces of production equipment each of which has a parts supply unit, the NC data management method comprising:

an NC data acquiring step for acquiring NC data used for operating each piece of the production equipment;

a step for acquiring a parts library used by each piece of the production equipment; and a step for automatically checking on an NC data preparation status of each piece of the production equipment in each line by referring to the acquired NC data, the parts library and a production preparation table that includes production plan information of each line.

5. The NC data management method of claim 4, wherein the automatic checking step instructs to output a warning when the automatic checking step judges that the NC data preparation status is not satisfactory.

6. The NC data management method of claim 5, wherein the acquired NC data is managed in a hierarchy composed of a plurality of layers of at least a line, equipment, data type, and a program version so that the acquired NC data is stringed between the plurality of layers with parameters corresponding to the plurality of layers.

7. An NC data management apparatus for use in a production line including a plurality of pieces of production equipment, each of which has a parts supply unit, the NC data management apparatus comprising:

an NC data acquiring unit for acquiring NC data used for operating each piece of the production equipment and for storing a production preparation table with production plan information from a scheduling system;

a library unit for storing a parts library used by each piece of the production equipment; and a checking device to automatically monitor the NC data preparation status of each piece of the production equipment in each line by referring to the acquired NC data, the parts library and the production preparation table that includes production plan information of each line.

8. The NC data management apparatus of claim 7 further including a controller unit for managing the acquired NC data in a hierarchy composed of a plurality of layers of at least a line, equipment, data type, and a program version so that the acquired NC data is stringed between the plurality of layers with parameters corresponding to the plurality of layers.

* * * * *